(12) United States Patent
Hardie et al.

(10) Patent No.: US 7,545,819 B1
(45) Date of Patent: Jun. 9, 2009

(54) TECHNIQUES FOR ASYNCHRONOUS COMPENSATION FOR SECURE COMMUNICATIONS

(75) Inventors: Tony Hardie, Fremont, CA (US); Terry Hardie, Union City, CA (US); John Grass, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 561 days.

(21) Appl. No.: 11/053,154

(22) Filed: Feb. 7, 2005

Related U.S. Application Data

(63) Continuation-in-part of application No. 10/367,669, filed on Feb. 14, 2003, now Pat. No. 7,228,488.

(60) Provisional application No. 60/565,803, filed on Apr. 26, 2004, provisional application No. 60/543,309, filed on Feb. 9, 2004, provisional application No. 60/357,364, filed on Feb. 15, 2002.

(51) Int. Cl.
*H04L 12/28* (2006.01)
(52) U.S. Cl. ....................... 370/401; 370/351
(58) Field of Classification Search ............... None
See application file for complete search history.

(56) References Cited

U.S. PATENT DOCUMENTS

| | | | |
|---|---|---|---|
| 5,404,394 A | 4/1995 | Dimolitsas et al. | |
| 5,426,643 A | 6/1995 | Smolinske et al. | |
| 5,600,663 A | 2/1997 | Ayanoglu et al. | |
| 5,724,414 A | 3/1998 | Dimolitsas et al. | |
| 5,870,412 A | 2/1999 | Schuster et al. | |
| 5,943,606 A | 8/1999 | Kremm et al. | |
| 5,963,621 A | 10/1999 | Dimolitsas et al. | |
| 6,141,788 A | 10/2000 | Rosenberg et al. | |
| 6,157,621 A | 12/2000 | Brown et al. | |
| 6,157,642 A | 12/2000 | Sturza et al. | |
| 6,243,846 B1 | 6/2001 | Schuster et al. | |
| 6,272,633 B1 * | 8/2001 | Duke et al. | 713/171 |
| 6,275,480 B1 * | 8/2001 | Schreier | 370/321 |
| 6,289,054 B1 | 9/2001 | Rhee | |
| 6,445,717 B1 | 9/2002 | Gibson et al. | |
| 6,477,669 B1 | 11/2002 | Agarwal et al. | |
| 6,490,705 B1 | 12/2002 | Boyce | |
| 6,504,838 B1 * | 1/2003 | Kwan | 370/352 |
| 6,542,499 B1 * | 4/2003 | Murphy et al. | 370/352 |
| 6,597,708 B1 | 7/2003 | Mauger et al. | |
| 6,675,340 B1 | 1/2004 | Hardie et al. | |
| 6,747,996 B2 | 6/2004 | Holloway et al. | |

(Continued)

OTHER PUBLICATIONS

Li et al. "Implementation and performance analysis of congestion-tolerant isochronous communication in ATM networks using diversified routing" Conference Record IEEE International Conference on Communications Serving Human.

(Continued)

*Primary Examiner*—Phirin Sam
(74) *Attorney, Agent, or Firm*—Townsend and Townsend and Crew

(57) ABSTRACT

Techniques for compensating for synchronous data stream transported over an asynchronous system are provided. The techniques include compensating for network jitter for an asynchronous connection over an asynchronous transport, using frame slip control for compensating for a synchronous connection over an asynchronous transport, and dropping filler frames for compensating for a synchronous connection over an asynchronous transport.

20 Claims, 10 Drawing Sheets

U.S. PATENT DOCUMENTS

| | | |
|---|---|---|
| 6,757,250 B1 | 6/2004 | Fayad et al. |
| 6,771,674 B1 | 8/2004 | Schuster et al. |
| 6,819,658 B1 | 11/2004 | Argarwal et al. |
| 6,839,330 B1 | 1/2005 | Chitre et al. |
| 7,017,102 B1 | 3/2006 | Hardie et al. |
| 7,161,905 B1* | 1/2007 | Hahn et al. ............... 370/231 |
| 7,161,931 B1* | 1/2007 | Li et al. .................... 370/352 |
| 2001/0031016 A1* | 10/2001 | Seagraves ................ 375/264 |
| 2002/0031126 A1 | 3/2002 | Crichton et al. |
| 2002/0126677 A1* | 9/2002 | Hathaway et al. ...... 370/395.64 |
| 2003/0026243 A1 | 2/2003 | Oran et al. |
| 2003/0123466 A1* | 7/2003 | Somekh et al. ........... 370/401 |
| 2003/0179752 A1 | 9/2003 | Grass |

OTHER PUBLICATIONS

U.S. Appl. No. 10/161,196, filed May 31, 2002, Kristensson.

U.S. Appl. No. 09/693,782, filed Oct. 19, 2000, Hardie.

O'Connor, J. et al., Implementation of secure voice (STU-III) into the land mobile satellite system, Jun. 1, 1992.

Li, Chung-Sheng et al., Implementation and performance analysis of congestion-tolerant isochronous communication in ATM networks using diversified routing, Conference Records IEEE International Conference, 1994, pp. 1341-1345.

* cited by examiner

TECHNIQUES FOR ASYNCHRONOUS COMPENSATION FOR SECURE COMMUNICATIONS

CROSS-REFERENCES TO RELATED APPLICATIONS

This application claims priority from the following co-pending U.S. Provisional Patent Application Nos.:

1. 60/543,309, filed Feb. 9, 2004, entitled, "SYSTEM AND METHOD FOR SECURE COMMUNICATION OVER PACKET NETWORK" and 2. 60/565,803, filed Apr. 26, 2004, entitled "SYSTEM AND METHOD FOR SECURE COMMUNICATION OVER PACKET NETWORK", both of which are incorporated by reference in their entirety for all purposes.

The application is also a continuation-in-part of U.S. patent application Ser. No. 10/367,669, filed Feb. 14, 2003, entitled, "SYSTEM AND METHOD FOR SECURE COMMUNICATION OVER PACKET NETWORK", which claims priority from U.S. Provisional Patent Application No. 60/357,364 filed Feb. 15, 2002, both of which are incorporated by reference in their entirety for all purposes.

This application is also related to:

U.S. application Ser. No. 11/053,067, entitled "NON-RELAY INITIALIZATION FOR MODEMS", filed concurrently herewith; and U.S. application Ser. No. 11/053,155, entitled "TECHNIQUES FOR LIMITING A DOPPLER EFFECT AND FAR END ECHO IN SYNCHRONOUS COMMUNICATIONS", filed concurrently herewith, both on which are incorporated by reference in their entirety for all purposes.

BACKGROUND OF THE INVENTION

The present invention generally relates to telecommunications and more specifically to techniques for asynchronous compensation methods for communication of secure information over packet networks.

For certain applications it is necessary to be able to establish secure communications between multiple terminals. For example, the U.S. government's secure terminal unit-III (STU-III), NATO's version STU-IIb, and future narrow band digital terminal (FNBDT) are examples of such systems. In a standard network connection, two terminals are connected together across a telephone network. Typically, the telephone network is digital and converts the analog transmissions from a terminal to a digital stream. Once a connection is established between the two terminals, the call switches from a regular voice call to a modem (modulator-demodulator) call. The encrypted voice communications are sent over the modem call.

Typically, the two terminals negotiate with each other to establish a connection. This negotiation involves sending modem tones across the network between the terminals. This process may take a long time depending on how long it takes the modem tone to traverse the network. This method includes many disadvantages. For example, the time it takes two terminals to establish a connection may be long.

As disclosed in co-pending U.S. application Ser. No. 11/053,067, entitled "NON-RELAY INITIALIZATION FOR MODEMS", filed concurrently, terminals may negotiate in parallel with communication gateways in a non-relay mode. Accordingly, a first terminal may finish it's negotiation with a first gateway before a second terminal finishes its negotiation with a second gateway. After the first terminal finishes its negotiation, it may start sending data to the second terminal. This data is stored in a queue at the second gateway until the second terminal and second gateway finish their negotiation. This may result in a large one-way backup of data. Thus, a large one way delay occurs because data in the queue is sent before new data. Thus, if a conversation is taking place and the second terminal sends data and a response to the data is sent by the first terminal, the response may not be sent to the second terminal right away because of the data backup in the queue. Thus, a conversation may not be synchronized because of the data backup.

BRIEF SUMMARY OF THE INVENTION

The present invention generally relates to techniques for compensating for synchronous data stream transported over an asynchronous system. The techniques include compensating for network jitter for an asynchronous connection over an asynchronous transport, using frame slip control for compensating for a synchronous connection over an transport, using frame slip control for compensating for a synchronous connection over an asynchronous transport, and dropping filler frames for compensating for a synchronous connection over an asynchronous transport.

In one embodiment, a method for compensating for data backup in a queue for synchronous communications between a first terminal and a second terminal is provided. The data is relayed from the first terminal to a first gateway, which sends the data to a second gateway in an asynchronous communication where the second gateway sends the data to the second terminal. The method comprises: receiving data for the asynchronous communication at the second gateway, wherein the first terminal sent the data and idle bits, wherein the idle bits are not sent from the first gateway to the second gateway; storing the data in a queue; and sending data from the queue from the second gateway to the second terminal.

In another embodiment, a method for compensating for data backup in a queue for synchronous communications between a first terminal and a second terminal is provided. The data is relayed from the first terminal to a first gateway, which sends the data to a second gateway in an asynchronous communication where the second gateway sends the data to the second terminal. The method comprises: receiving data for the asynchronous communication at the second gateway from the first gateway over a packet based network; storing the data in a queue, the data including communication data and filler information; interpreting the data in the queue to determine if it includes filler information; discarding the filler information; and sending communication data from the queue instead of the filler information.

In yet another embodiment, a system for compensating for data backup in a queue for synchronous communications between a first terminal and a second terminal is provided. The data is relayed from the first terminal to a first gateway, which sends the data to a second gateway in an asynchronous communication where the second gateway sends the data to the second terminal. The method comprises: a first terminal configured to send a synchronous data stream that is scrambled; a first gateway configured to receive the synchronous data stream that is scrambled and to convert the synchronous data to an asynchronous data stream that that includes the scrambled data; a second gateway configured to receive the asynchronous data stream that includes the scrambled data and determine the scrambled data from the asynchronous data stream, wherein the second gateway is configured to: store the data in a queue, the data including communication data and filler information; interpret the data in the queue to determine if it includes filler information; discard the filler information; and send communication data from the queue instead of the filler information.

In another embodiment, a system compensating for data backup in a queue for synchronous communications between a first terminal and a second terminal is provided. The data is relayed from the first terminal to a first gateway, which sends the data to a second gateway in an asynchronous communication where the second gateway sends the data to the second terminal, the method comprising: a first terminal configured to send a synchronous data stream that includes communication data and idle bits; a first gateway configured to receive the synchronous data stream and idle bits and configured to discard the idle bits thereby sending an asynchronous data stream that includes the communication data and not the idle bits; a second gateway configured to receive the asynchronous data stream that includes the communication data and convert it into a synchronous data stream; and a second terminal configured to receive synchronous data stream.

In another embodiment, a method for compensating for late or lost data in synchronous communications between a first terminal and a second terminal is provided. The data is relayed from the first terminal to a first gateway, which sends the data to a second gateway in an asynchronous communication where the second gateway sends the data to the second terminal. The method comprises: receiving data for the asynchronous communication at the second gateway; storing the data in a queue; sending the data from the queue to the second terminal; determining when the queue may underrun due to late or lost data sent from the first gateway to the second gateway; and sending data previously transmitted from the queue.

A further understanding of the nature and the advantages of the inventions disclosed herein may be realized by reference of the remaining portions of the specification and the attached drawings.

DETAILED DESCRIPTION OF THE INVENTION

Figure 1:
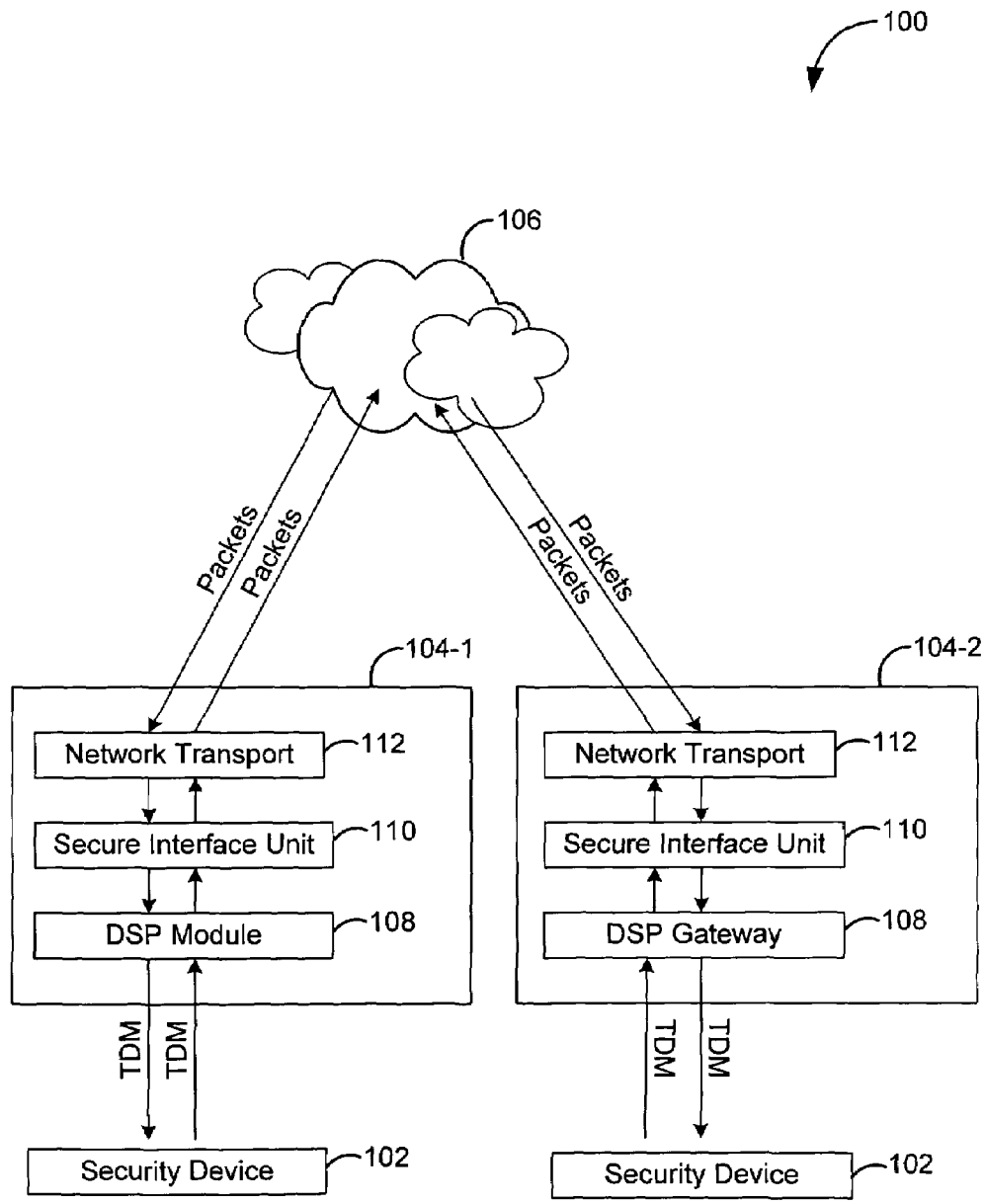
FIG. 1 depicts a system for transmitting secure information over a packet-based network according to one embodiment of the present invention.

FIG. 1 depicts a system 100 for transmitting secure information over a packet-based network according to one embodiment of the present invention. As shown, system 100 includes one or more secure devices 102, a first gateway 104-1, and a second gateway 104-2, and a network 106.

Network 106 may be any packet-based network. Network 106 transports data asynchronously. For example, network 106 is configured to transfer packets received from gateways 104. In one embodiment, packet-based network 106 may be a frame relay or asynchronous transfer mode (ATM) network.

Secure device 102 may be any device configured to transmit information according to a secure protocol. For example, secure device 102 may be a future narrow band digital terminal (FNBDT), a secure terminal unit-III (STU-III), a STU-IIb, etc. Also, although secure devices are described, it will be understood that other non-secure modems may be used, such as generic modems (any V.90 and below modems, i.e. v.90, v.34, v.32, v.22 etc. and group 3 fax modems). Also, secure devices may be any full duplex modulator/demodulators. Thus, embodiments of the present invention are not limited to devices that communicate using a secure protocol.

Secure device 102 is configured to send and receive a synchronous data stream. Examples of a synchronous data stream include time division multiplex (TDM) information, 2 or 4 wire analog circuit data, etc. For example, secure device 102 sends TDM information to gateway 104 and receives TDM information from gateway 104. Although TDM is described, it will be understood that other synchronous data streams, such as any analog modem audio signals transported over a medium, analog modem signals over a 2/4-wire circuit, etc., may be sent and embodiments of the present invention are not restricted to TDM information.

Gateway 104 is configured to receive TDM information from secure device 102 and generate packets that include the TDM information. In packetizing the TDM information, a synchronous data stream is converted into an asynchronous data stream. In one embodiment, the TDM information is converted into a voice-over Internet protocol (VOIP) signal for transmission over packet-based network 106. In other embodiments, the TDM information may be converted into other formats, such as a frame relay, asynchronous transfer mode (ATM), or other protocols. Various VOIP signaling protocols may be used, such as H.323, SIP, voice-over ATM or voice-over frame relay, or other proprietary protocols.

Gateway 104-1 maintains a call through packet-based network 106 to gateway 104-2. In one embodiment, the call is maintained through the use of VOIP signaling protocols as a connectionless call. Data is communicated through packet-based network 106 by parsing the stream of TDM data received from secure devices 102 into frames of data. The frames are then put into VOIP packets. The packets are transferred through packet-based network 106 in the IP packets from gateway 104-1 to gateway 104-2, and vice versa.

When a gateway 104 receives the data packets, gateway 104 is configured to convert information in the packets into a synchronous data stream. In one embodiment, the information in the data packets is converted into a TDM data stream. The TDM data stream is then transferred to secure device 102.

Gateway 104 includes a digital signal processor (DSP) module 108, a secure interface unit 110, and a network transport module 112 in one embodiment. The process of sending communicating TDM data will now be discussed in more detail. DSP module 108 is configured to receive TDM data in a TDM-based protocol and is configured to send data to secure interface unit 110. In one embodiment, the TDM data may be TDM digital audio (raw pulse code modulated (PCM)⁻ line coded such as A-Law or µ-Law depending on the line coding) from a TDM-based protocol. Secure interface unit 110 can reside inside the DSP module 108 as DSP code or separately on gateway 104 where DSP module 108 passes the TDM information in byte format segments to the secure interface unit 110.

Secure interface unit 110 is configured to process the TDM data and outputs data that can be transmitted over network 106 as packets. Secure interface unit 110, in one embodiment, operates on a non-real time operating system. The secure interface unit 110 is only executed when TDM data is received from DSP module 108. Thus, secure interface unit 112 is not run off the same clock as DSP module 108.

Network transport 112 is configured to send packets received from security interface unit 110 over network 106 to another gateway 104. Network transport 112 may take the payload data from secure interface unit 110 and "packetize" the payload into Internet protocol (IP) packets or asynchronous transfer mode (ATM) packets, etc.

Packets sent over network 106 are received at a second network transport 112. The packets are then routed to secure interface unit 110. The packets are processed and TDM data is outputted by secure interface unit 110. For example, audio samples are determined from information stored in the packets and are compatible with a TDM circuit. Secure interface unit 110 can reside inside DSP module 108 as DSP code or separately on the gateway 104 where DSP module 108 passes the TDM information in byte format segments to secure interface unit 110. The TDM data is then sent to DSP module 108. DSP module 108 takes the TDM byte segment/chunks of data and transmits that data from its buffer at regular clocked intervals, which sends the TDM data to secure device 102.

Accordingly, a secure device 102 that is configured to send and receive TDM data can have the TDM data sent over packet-based network 106 using gateways 104. The following description may be described in one direction (from a first secure terminal to a second secure terminal) but it will be recognized that the communication may flow back from the second secure terminal to the first secure terminal using the same techniques (i.e., the system is full-duplex).

Figure 2:
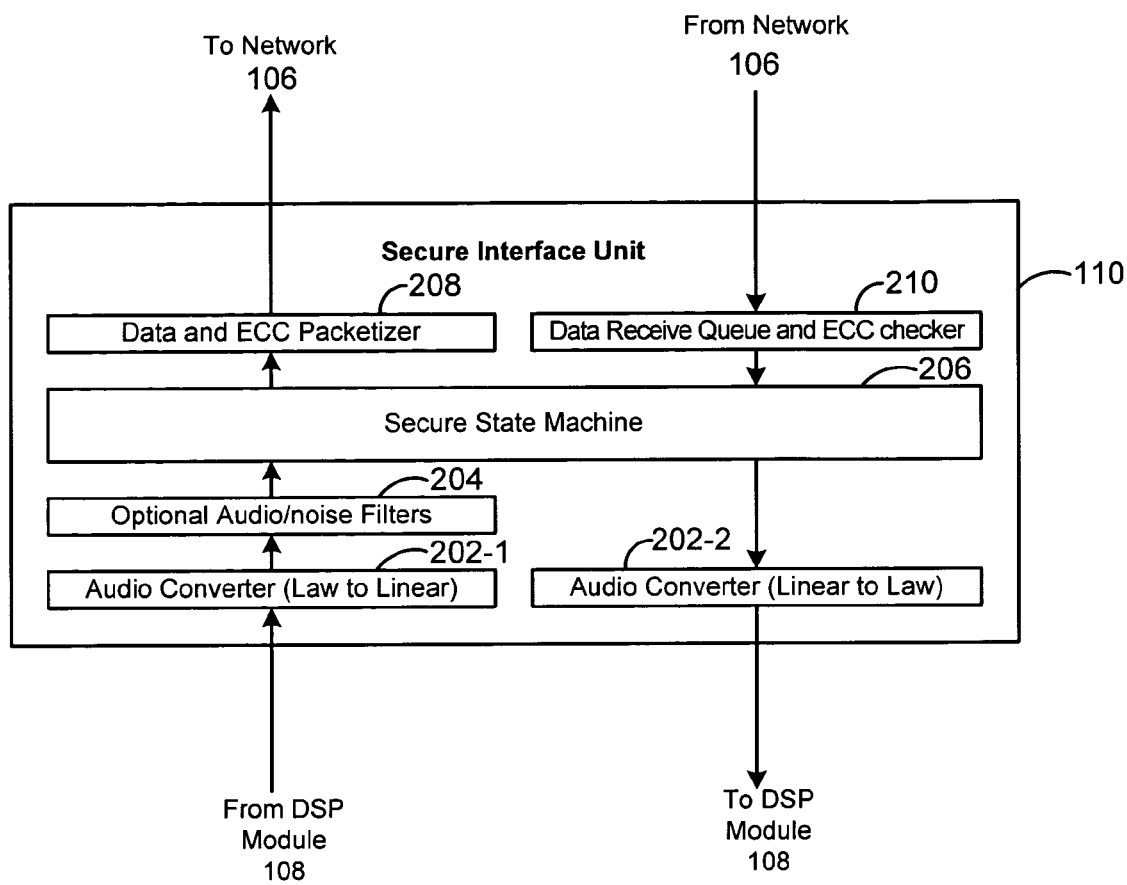
FIG. 2 depicts a more detailed embodiment of secure interface unit according to embodiments of the present invention.

FIG. 2 depicts a more detailed embodiment of secure interface unit 110 according to embodiments of the present invention. As shown, secure interface 110 includes an audio converter 202-1 and 202-2, an audio/noise filter 204, a secure state machine 206, a data and error correction circuit (ECC) packetizer 208, and a data receive queue and ECC checker 210.

The process of sending data to network 106 will now be described. The TDM data is received from DSP module 108 at audio converter 202-1. Audio converter 202-1 is configured to take the TDM information and convert it into PCM information. For example, the audio samples received from DSP 108 are converted from whatever LAW encoding is on the TDM line (8-bit µ-LAW or A-LAW) to 16-bit linear PCM samples. Any audio/noise filters 204 may be used to filter noise or audio. In one embodiment, audio/noise filters 204 are optional.

Secure state machine 206 processes the PCM information received from audio converter 202-1 and audio/noise filters 204 and processes the audio to be output to data receive queue and ECC packetizer 208. In processing the data, secure state machine 206 determines at what stage in the secure negotiation protocol is (what TDM data/tones are being sent and received and what data/control messages from the network are being received) and sends the appropriate response tones back down to the TDM or data/control messages to the network.

Data receive queue and ECC packetizer 208 is configured to packetize the data with forward error correction (if enabled) for the packets sent, if necessary. For example, the data to be transmitted to network 106 is framed with ECC-redundant frames and sequence numbering are added, the network will add packet headers.

The process of receiving data from network 106 will now be described. The packets are received from network 106 at a data receive queue and ECC checker 210. Data receive queue and ECC checker 210 is configured to extract the data stored in the packets and also to provide error correction. The data is then sent to secure state machine 206 and stored in a buffer. The state machine is only activated when data is received from 204 and determines at what stage in the secure negotiation protocol is (what TDM data/tones are being sent and received and what data/control messages from the network are being received) and send the appropriate response tones back down to the TDM or data/control messages to the network.

The data is then outputted to audio converter 202-2, which converts the data back from 16-bit Linear PCM format to the TDM 8-bit LAW (8-bit µ-LAW or A-LAW) format. The TDM data is then output to secure device 102.

Figure 3:
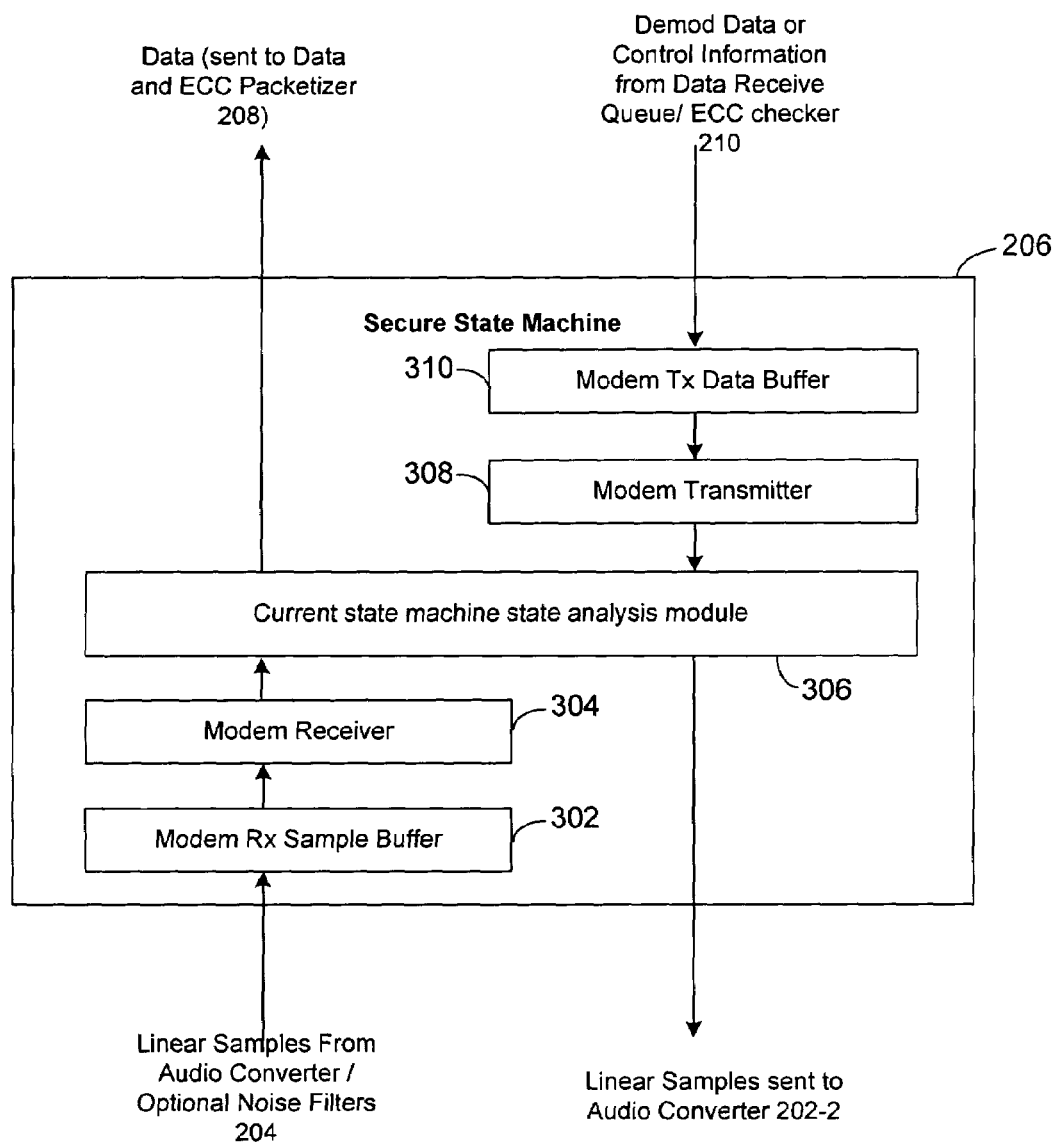
FIG. 3 depicts a more detailed embodiment of secure state machine according to embodiments of the present invention.

FIG. 3 depicts a more detailed embodiment of secure state machine 206 according to embodiments of the present invention. Secure state machine 206 includes a modem receiver sample buffer 302, a modem receiver 304, a current state machine analysis module 306, a modem transmitter 308, and a modem transmitter data buffer 310.

Modem receiver sample buffer 302 is configured to store linear samples received from audio/noise filters 204. The audio samples are then sent to modem receiver 304. Modem receiver 304 may produce demodulated data from the audio sampler.

Current state machine state analysis module 306 is configured to produce control data to be transmitted to a second gateway 104-2. Current state machine state analysis module 306 checks the secure interface unit 110 and decides whether or not to stay in the same state or progress to the next state the next time the secure interface unit state machine is executed. The output is then sent to data and ECC packetizer 208.

The process where information is received from data and ECC packetizer 208 will now be described. When information is received from network 106, the modulated data or control information from data receive queue and ECC checker 210 is received at modem transmitter data buffer 310. The data is buffered until it is sent to modem transmitter 308, which produces linear samples to be transmitted as TDM data.

Current state machine state analysis module 306 receives the linear samples and determines whether or not to stay in the same state or progress to the next state the next time the secure interface unit 110 is executed. The data is then sent to audio converter 202-2.

Call Initialization Techniques

Figure 4:
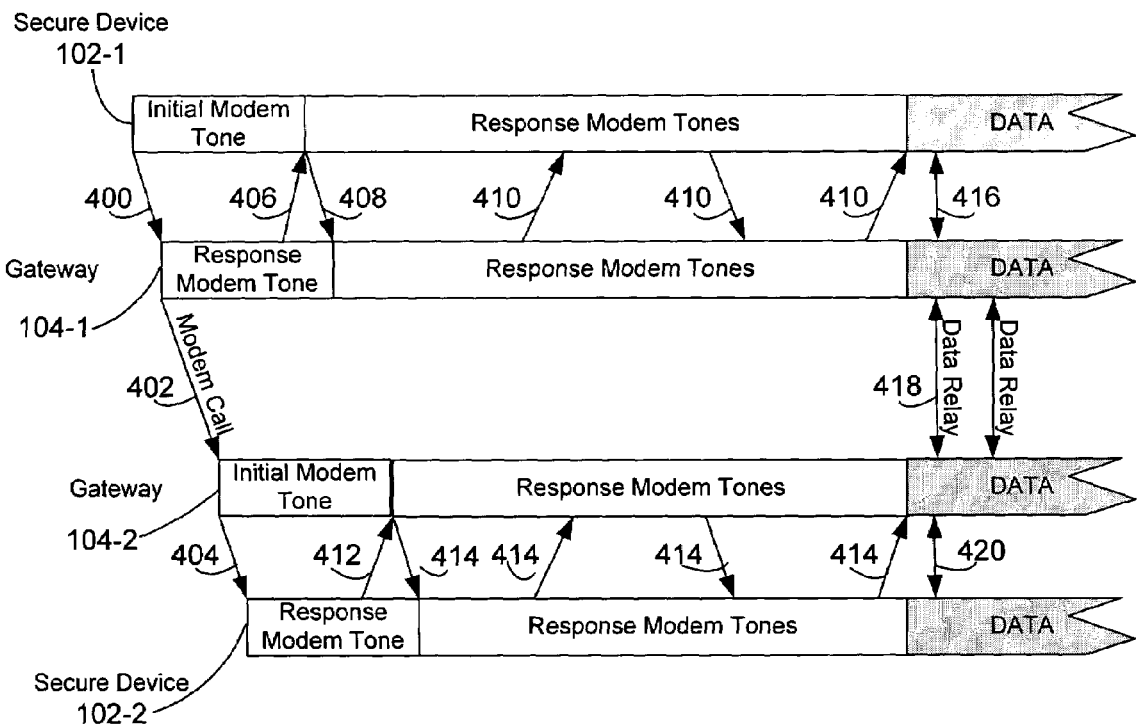
FIG. 4 depicts a non-relay mode flow of information for establishing an asynchronous or synchronous data connection between secure devices over an asynchronous transport according to one embodiment of the present invention.

FIG. 4 depicts a non-relay mode flow of information for establishing an asynchronous or synchronous data connection between secure devices 102-1 and 102-2 over an asynchronous transport according to one embodiment of the present invention. Secure device 102-1 initiates a request for establishing a connection with secure device 102-2. In one embodiment, secure devices 102-1 and 102-2 may be FNBDT devices. Other devices, however, may be used, such as generic modems and other secure devices. For example, at 400, a message is sent from secure device 102-1 to secure device 102-2 and is received at gateway 104-1. The message may be a call initiation request for secure device 102-2.

At 402, gateway 104-1 then sends a network control message to initialize a connection with secure device 102-2 to gateway 104-2. Gateway 104-2 then communicates with secure device 102-2 to indicate that a data connection should be established with secure device 102-1.

Gateway 104-1 and secure device 102-1 then communicate in order to establish a modem call and gateway 104-2 and secure device 102-2 communicate to establish a modem call. Typically, secure device 102-1 and secure device 102-2 communicate with each other to establish the connection. However, in an embodiment of the present invention, gateways 104 are used to establish the connection. This offers many advantages. For example, the negotiation happens faster because secure device 102-1 and gateway 104-1 and secure device 102-2 and gateway 104-2 are negotiating with each other in parallel. Also, the negotiation may be more efficient because the secure device 102-1 and gateway 104-1, and secure device 102-2 and gateway 104-2 are closer to each other than if information was relayed between secure device 102-1 and secure device 102-2. Thus, responses may be sent quicker.

Also, secure devices 102-1 and 102-2 may perceive that a delay is local. The response time for a response received from gateway 104-1 or 104-2 is used to measure how far away gateway 104-1 or 104-2 is from secure devices 102-1 or 102-2. This is used set the echo canceller. For example, the echo canceller is set to cancel the echo at a certain time when echo is expected. Modems that perceive the delay to be longer would result in the modem echo cancellers that "think" the echo is located at the far end when in fact it is not (the echo is actually between secure device 102-1 and gateway 104-1 and secure device 102-2 and gateway 104-2, respectively, and not between secure device 102-1 and secure device 102-2). It is more accurate to have the secure devices 102-1 and 102-2 perceive the delay is local rather than at the far end.

At 406, gateway 104-1 sends a response modem tone to secure device 102-1. At 408, an initial modem tone is then returned to gateway 104-1. At 410, response modem tones are then sent between gateway 104-1 and secure device 102-1 until the modems have finished training and a data connection is established between gateway 104-1 and secure device 102-1 where data can be relayed. A person skilled in the art will appreciate details of the process of training two modems to communicate to establish a data connection.

A similar process is performed between gateway 104-2 and secure device 102-2. At 412, a response modem tone is sent from secure device 102-2 to gateway 104-2. At 414, the initial modem tone and then response modem tones are sent between secure device 102-2 and gateway 104-2 until a data connection between secure device 102-2 and gateway 104-2 is established.

Once the connection is established, data may be sent between secure device 102-1 and secure device 102-2. At 416, data is first sent from secure device 102-1 to gateway 104-1. At 418, data is relayed between gateway 104-1 and gateway 104-2. At 420, data is then sent from gateway 104-2 to secure device 102-2. This process may also work in the reverse for communications from secure device 102-2 and secure device 102-1.

Accordingly, gateways 104 are used to negotiate with secure devices 102 in order to establish a connection. Once a connection is established between gateways 104 and secure devices 102, data can be relayed between gateway 104-1 and gateway 104-2. Because gateways 104 communicate using a packet-based network 104, a training negotiation between gateways 104 is not necessary. Because gateways 104 are deemed to be local to secure devices 102, the communication to establish a data connection may be negotiated locally and thus provides faster and more efficient negotiations.

Figure 5:
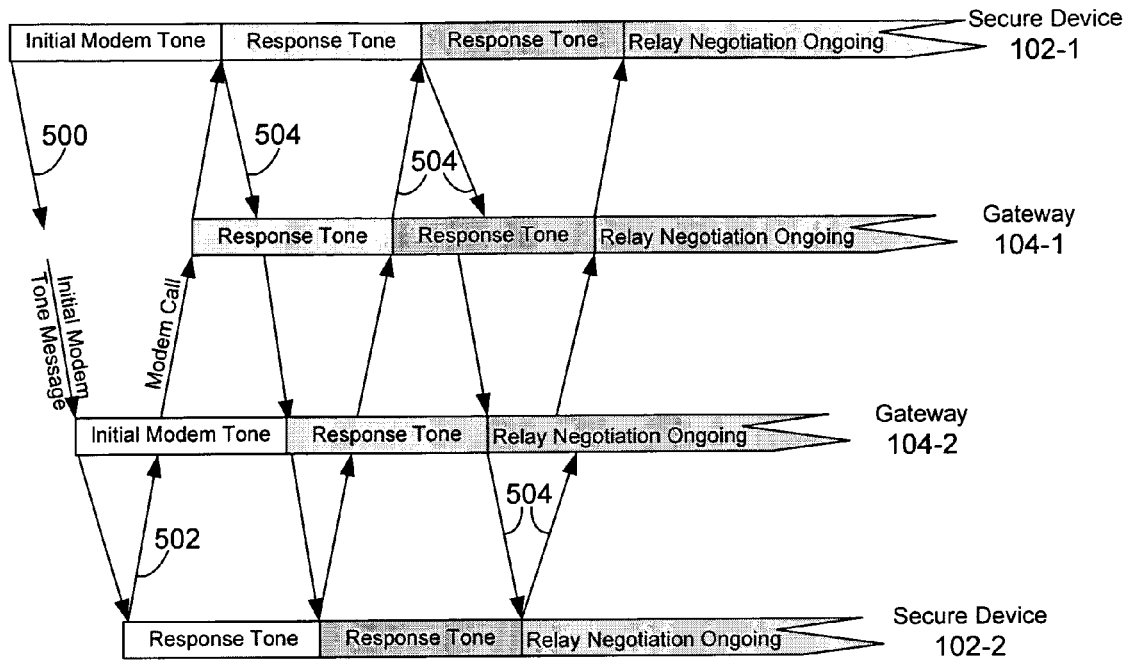
FIG. 5 depicts a data flow of a relay mode for establishing a connection according to one embodiment of the present invention.

FIG. 5 depicts a data flow of a relay mode for establishing a connection according to one embodiment of the present invention. In the relay mode, secure devices 102 may be a STU terminal and messages may be relayed from secure device 102-1 to gateway 104-1. Other devices, however, may be used, such as generic modems and other secure devices. Gateway 104-1 then relays the messages to gateway 104-2, which then relays the message to secure device 102-2.

As shown at 500, an initial modem tone message is sent from secure device 102-1 to gateway 104-1. The initial modem tone message is then relayed to gateway 104-2, which then relays a modem tone to secure device 102-2. At 502, a response tone is then sent from secure device 102-2 through gateway 104-2 and gateway 104-1 to secure device 102-1. At 504, response tones are then relayed between secure device 102-1 and secure device 102-2 through gateway 104-1 and gateway 104-2.

The negotiation is ongoing until the negotiation is fully relayed and a data connection is established. Once the negotiation is finished, a connection is established between secure device 102-2 and secure device 102-1. In the connection, data sent from secure device 102-1 is relayed through gateway 104-1 and from gateway 104-2 to secure device 102-2, and vice versa.

In one embodiment, relay and non-relay modes may be intermixed. For example, initial modem tones may be sent that are compatible with STU and FNBDT. These tones are relayed until a gateway 104 can determine what the device is. At that time, the signaling may be relayed or may diverge to a non-relay type. For example, if the secure device 102 is a FNBDT device, then the signaling may convert to a non-relay mode.

Asynchronous Compensation Methods

Because packets are sent through packet-based network 106, delay in sending packets through network 106 (jitter) may occur. Data queues and error correction may be used to correct timing issues that occur with IP jitter or variances in delay. However, other issues arise because the delay may cause queues to under run or overrun. For example, because of non-relay negotiation, it is possible for secure device 102-1 to finish its negotiation significantly before a secure device 102-2 finishes its negotiation. Secure device 102-1 may start sending data to gateway 104-1, which then sends the data to gateway 104-2. This may result in a large amount of data backup at gateway 104-2 and thus a larger, one-way delay. The sent data from secure device 102-1 may be stored at gateway 104-2 in a queue until gateway 104-2 finishes its negotiation with secure device 102-2. When the negotiation is finished, data may be sent from gateway 104-2 to secure device 102-2. However, because the negotiation took longer than the negotiation for secure device 102-1 and gateway 104-1, there may be a large data backup at gateway 104-2.

Figure 6:
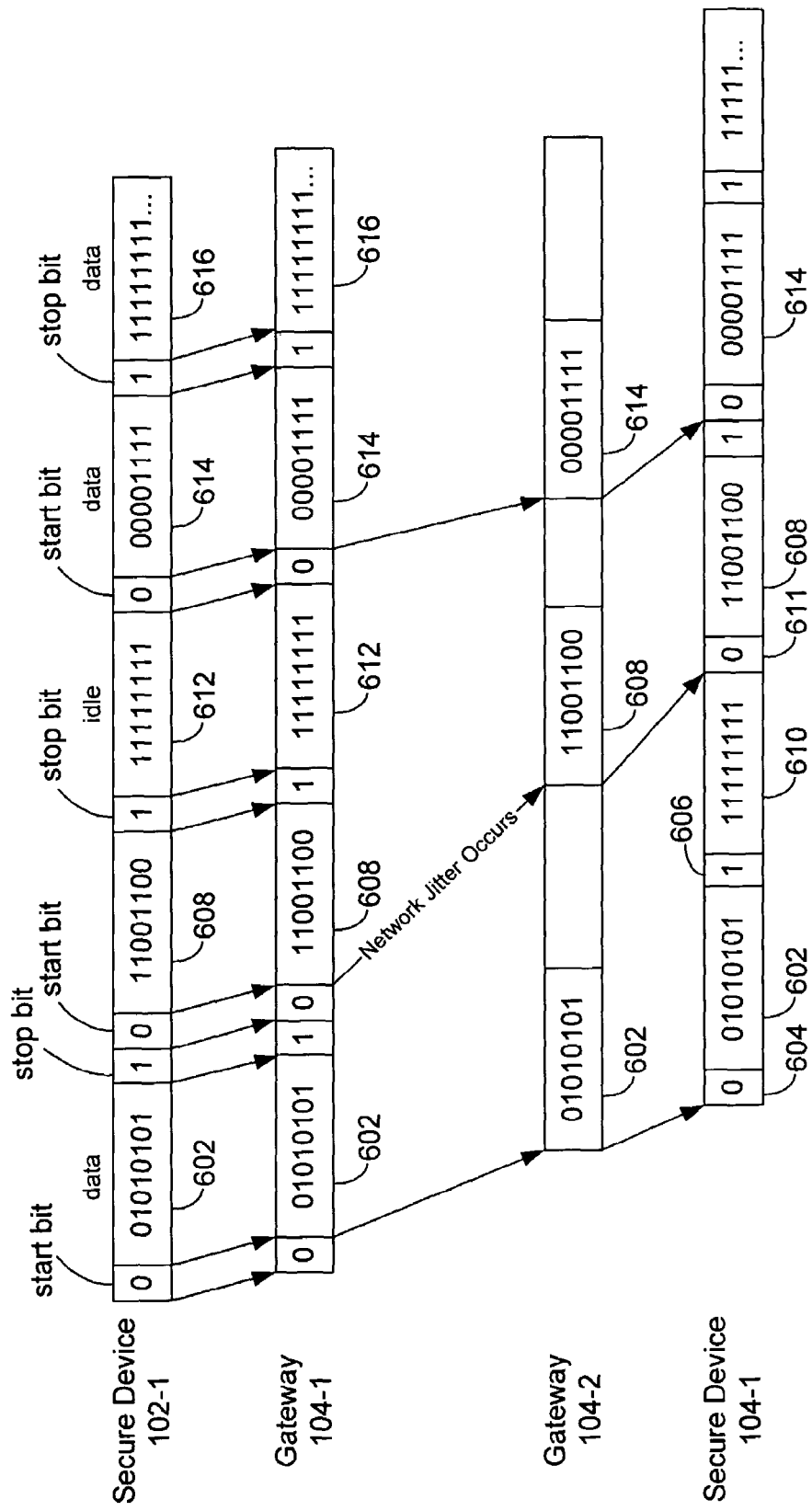
FIG. 6 shows a method for compensating for network jitter for an asynchronous connection over an asynchronous transport according to one embodiment of the present invention.

Accordingly, asynchronous compensation methods may be used to decrease the data backup as depicted in FIG. 6 according to one embodiment of the present invention. FIG. 6 shows data sent by secure device 102-1 and data received secure device 102-2. Data is sent through gateway 104-1 and gateway 104-2. Gateway 104-2 stores the data received in a queue. When the queue is not able to return valid data to secure device 102-2 for any of the above reasons, idle bits were conventionally transmitted to secure device 102-2.

However, in one embodiment, during idle periods, gateway 104-2 may send data backed up in the queue instead of idle bits. Also, when secure device 104-1 is not able to send data, idle bits are sent. Because stop and start bits are not sent from gateway 104-1 to gateway 104-2, the queue may be collapsed down during idle periods. In this case, gateway 104-2 does not rely on start and stop bits originally sent by secure device 102-1 to send data to secure device 102-2. Rather, gateway 104-2 sends start and stop bits when it is ready to send data to secure device 102-2. Gateway 104-1 can thus discard idle bits and only send data. Idle bits are thus not stored in a queue at gateway 102-2 and backed up data in the queue can be sent instead of idle bits.

FIG. 6 shows a method for compensating for network jitter for an asynchronous connection over an asynchronous transport according to one embodiment of the present invention. As shown in FIG. 6, a data block 602 is sent from secure device 102-1. The data block is sent through gateway 104-1 and received at gateway 104-2. Gateway 104-2 then sends a start bit 604 and data block 602 to secure device 102-2. A stop bit 606 is then sent.

Secure device 102-1 then sends data block 608 to secure device 102-2 along with stop and start bits. The stop and start bits are not sent from gateway 104-1 to gateway 104-2 in one embodiment. Gateway 104-1 receives data block 608 and transmits it to gateway 104-2. During this transmission, IP jitter may occur that delays the transmission of data block 608. Accordingly, the queue of gateway 104-2 does not have valid data to send. In one embodiment, if data was backed up in the queue, gateway 104-2 may send data instead of the idle bits. This would collapse down the queue. However, in this case, the queue is not backed up and idle bits are sent in a block 610.

Secure device 102-1 then sends idle bits in a block 612. These idle bits may not be transferred to gateway 104-2. Thus, the idle bits are not received by gateway 104-2 and stored in the queue thereby not filling the queue at gateway 104-2 with idle bits.

Secure device 102-1 then sends a data block 614 to a secure device 102-2. Gateway 104-2 receives the data block and stores it in the queue behind block 608.

Gateway 104-2 then sends block 608 to secure device 102-2. Block 614 is then sent to secure device 102-2. Accordingly, the idle bits sent from secure device 102-1 are not sent from gateway 104-1 to gateway 104-2. Thus, the queue size at gateway 104-2 is minimized. Jitter may delay block 608. If idle bits in block 612 are sent, then gateway 104-2 would have to send those bits to secure device 102-1. However, because the idle bits are not sent to gateway 104-2, gateway 104-2 can send the bits in block 614 when it is received and thus data backup is minimized.

Idle bits in a block 616 are then sent from secure device 102-1 to gateway 104-1. These idle bits are not sent from gateway 104-1 to 104-2. If the queue of gateway 104-2 does not have data to return, then gateway 104-2 may send idle bits to secure device 102-2. Because gateway 104-2 is configured to send data in a queue or idle bits if there is no data, idle bits can be discarded by gateway 104-1.

Discarding the idle bits and sending valid data decreases a backup in a queue and allows gateway 104-2 to efficiently decrease a data backup that may occur. This results in no noticeable audio problems because the data is sent during idle periods. Accordingly, delays that may occur when sending data through a packet-based network 106 may be decreased by discarding idle bits. This is possible in one part because the start and stop bits that are used to distinguish when data is being sent from secure device 102-1 are not necessary when using gateway 104-1 and gateway 104-2. Rather, gateway 104-2 can determine when data needs to be sent, and then sends the stop and start bits.

Figure 7:
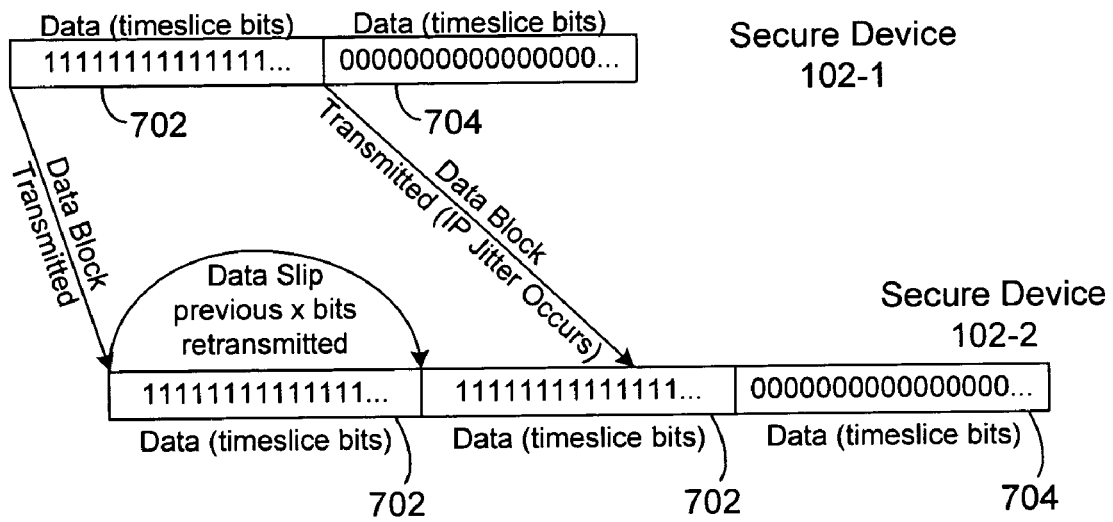
FIG. 7 depicts a data flow for using frame slip control for compensating for a synchronous connection over an asynchronous transport according to one embodiment of the present invention.

FIG. 7 depicts a data flow for using frame slip control for compensating for a synchronous connection over an asynchronous transport according to one embodiment of the present invention. Frame slip control is used for compensating for late/lost data. This method prevents a queue from reaching an under run condition. The under run condition should not happen at the risk of losing modem synch. A simple data queue slip may occur when data to be sent to secure device 102 is late or is not received. When this occurs, previous data is retransmitted. This allows the secure call to be maintained.

As shown, a data block 702 is transmitted. Block 702 is received at secure device 102-2 through gateways 104-1 and 104-2. A second data block 704 is sent from secure device 102-1. In this case, IP jitter occurs and the queue may under run. Accordingly, gateway 104-2 sends the previously received data block 702 to secure device 102-2. When data block 704 is received, gateway 104-2 sends the data block 704 to secure device 102-2. Accordingly, the synchronization between secure device 102-2 and gateway 104-2 is not lost. This may result in a noticeable blip in the audio; however, the secure call is maintained using frame slip control.

Figure 8:
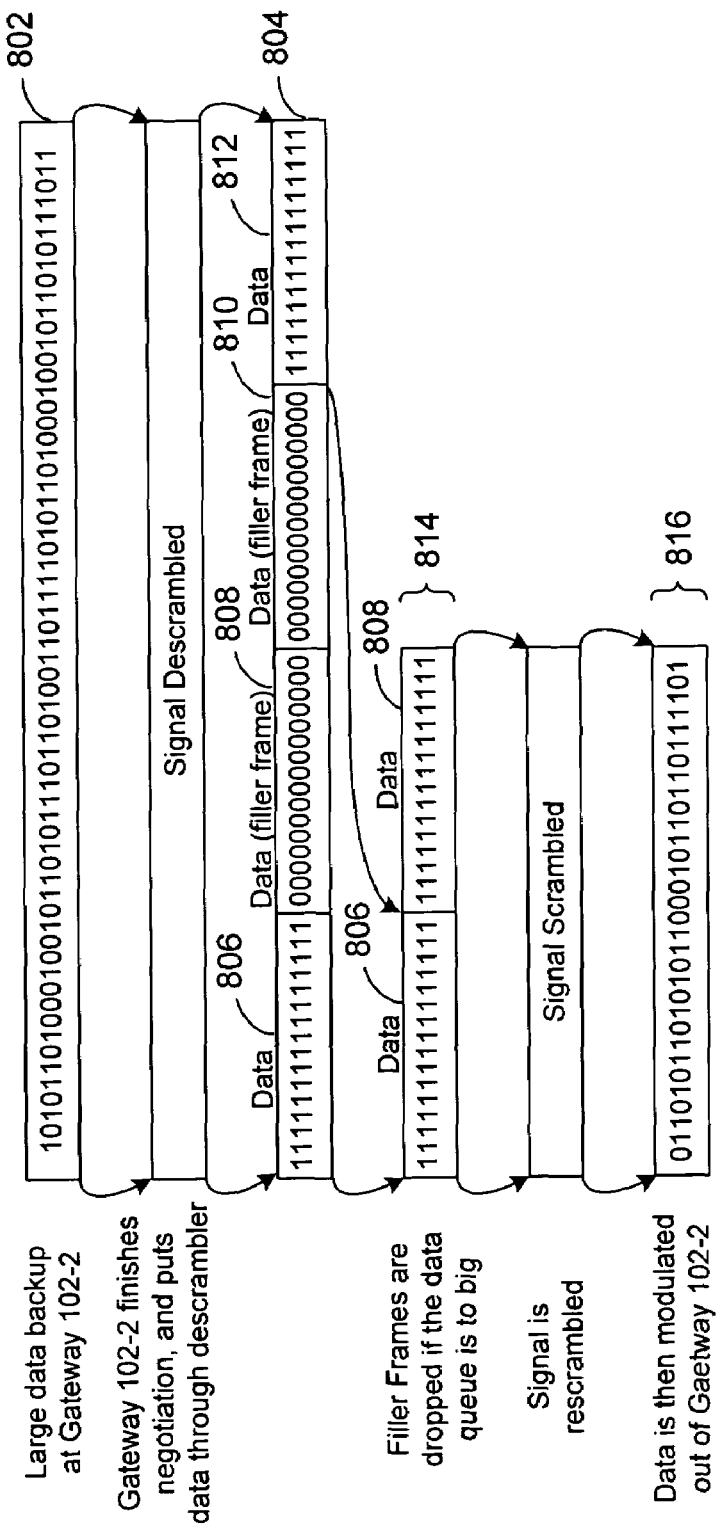
FIG. 8 depicts a data flow for dropping filler frames for compensating for a synchronous connection over an asynchronous transport according to one embodiment of the present invention.

FIG. 8 depicts a data flow for dropping filler frames for compensating for a synchronous connection over an asynchronous transport according to one embodiment of the present invention. The method described may be used to compensate when non-relay (parallel) negotiation is used where a secure device 102-1 finishes its negotiation a lot sooner than a secure device 102-2, thus resulting in a large backup of data and thus a large, one-way delay. For example, the negotiation between secure device 102-1 and gateway 104-1 may finish before a negotiation between secure device 102-2 and gateway 104-2. Secure device 102-1 may start sending data before the negotiation between secure device 102-2 and gateway 104-2 finishes. The data that is received at gateway 104-2 is stored in a queue. The data may then backup in the queue.

In one embodiment, during an initial negotiation using STU, a data application layer transmits periods of filler frames while awaiting responses to negotiation signals sent. For example, secure device 102-1 may send filler frames to gateway 104-1 when awaiting responses from gateway 104-1. In one embodiment, these filler frames (as scrambled data) are then transferred to gateway 104-2. This same process happens at gateway 104-1 for data flowing from gateway 104-2 to gateway 104-1.

In one embodiment, gateway 104-2 may drop the filler frames from the queue to reduce the overall queue size. However, in order to determine which frames are filler frames, a descrambler/scrambler is used to interpret whether the information received is a filler frame that can be discarded. In modem communications, the information is scrambled and sent between secure device 102-1 and secure device 102-2. During negotiation, data and filler frames are both sent.

As shown in FIG. 8, a large data backup in a queue 802 is shown. Queue 802 may be found at a gateway 104-2. When secure device 102-2 finishes its negotiation with gateway 104-2, the data in the queue 802 is descrambled. As shown in queue 804, it is determined (in this example) that a first block 806 is data, a second block 808 is a filler frame, a third block 810 is a filler frame, and fourth block 812 is data. Blocks 808 and 810 are filler frames and are thus discarded. As shown in queue 814, first block 806 and fourth block 808 are now stored in the queue. The signal is then scrambled and the scrambled data is shown in queue 816. This data may then be sent.

Accordingly, the data transmitted to a secure device 102 is descrambled and is interpreted to determine if the data includes filler frames. Filler frames are dropped if a queue size is determined to be too big. For example, if the queue size is above a certain threshold, then the filler frames may be dropped at a gateway 104. Thus, instead of sending filler frames to secure device 102, gateway 104 drops the filler frames and sends data. Thus, by descrambling the data sent from a secure device 102 and interpreting the data, filler frames may be determined. This adds additional intelligence to the gateway 104 and allows for the reduction of a queue size that includes data backup.

APPLICATIONS OF EMBODIMENTS OF THE PRESENT INVENTION

Elimination of the Doppler Effect

Figure 9:
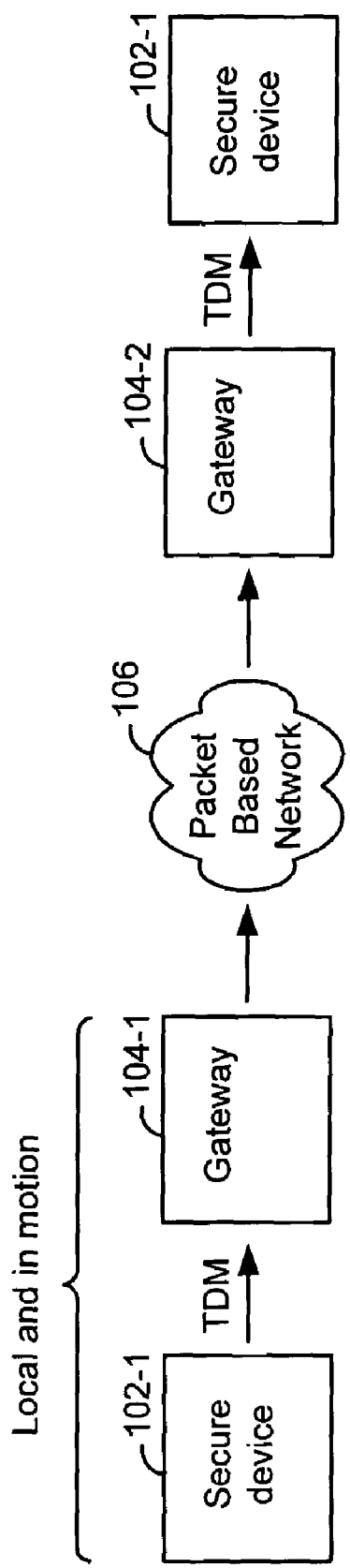
FIG. 9 depicts a system for eliminating the Doppler effect according to one embodiment of the present invention.

FIG. 9 depicts a system 900 for eliminating the Doppler effect according to one embodiment of the present invention. As shown, secure device 102-1, and gateway 104-1, gateway 104-2, secure device 102-2 are provided. In one embodiment, system 100 may be used to eliminate a Doppler effect that may occur when communications between secure device 102 and secure device 102-2 occur.

If secure device 102-1 is in motion, a Doppler effect may occur when secure device 102 communicates with secure device 102-2 using a synchronous or time based data transport, such as time division multiplexing (TDM). The Doppler effect occurs because the information communicated is not synchronized. However, using embodiments in the present invention, the Doppler effect is not a factor because information is communicated over a packet-based network 106. The communication over the packet-based network does not have to be synchronized. Thus, the Doppler effect is avoided.

Accordingly, if a gateway 104-1 is situated local to secure device 102-1, the Doppler effect is avoided. In one example, secure device 102 communicates with gateway 104-1 using TDM. Because gateway 104-1 is situated local to secure device 102-1, the motion that secure device 102-1 may be subject is the same motion that gateway 104-1 is subject to and thus does not produce a Doppler effect.

Gateway 104-1 packetizes the information and communicates it over packet-based network 106 to gateway 104-2. Gateway 104-2 is then configured to convert the packetized information to TDM information and send that information to secure device 102-2.

Accordingly, the Doppler effect is eliminated because a packet-based format is used to communicate between gateway 104-1 and gateway 104-2. Information communicated in a packet-based format does not need to be synchronized. Thus, even though gateway 104-1 may be in motion when the data is communicated, the Doppler effect does not effect the communication. Thus, communications between secure device 102-1 and secure device 102-2 may be performed without the Doppler effect even if secure device 102 is in motion.

Far Echo Processing

Figure 10:
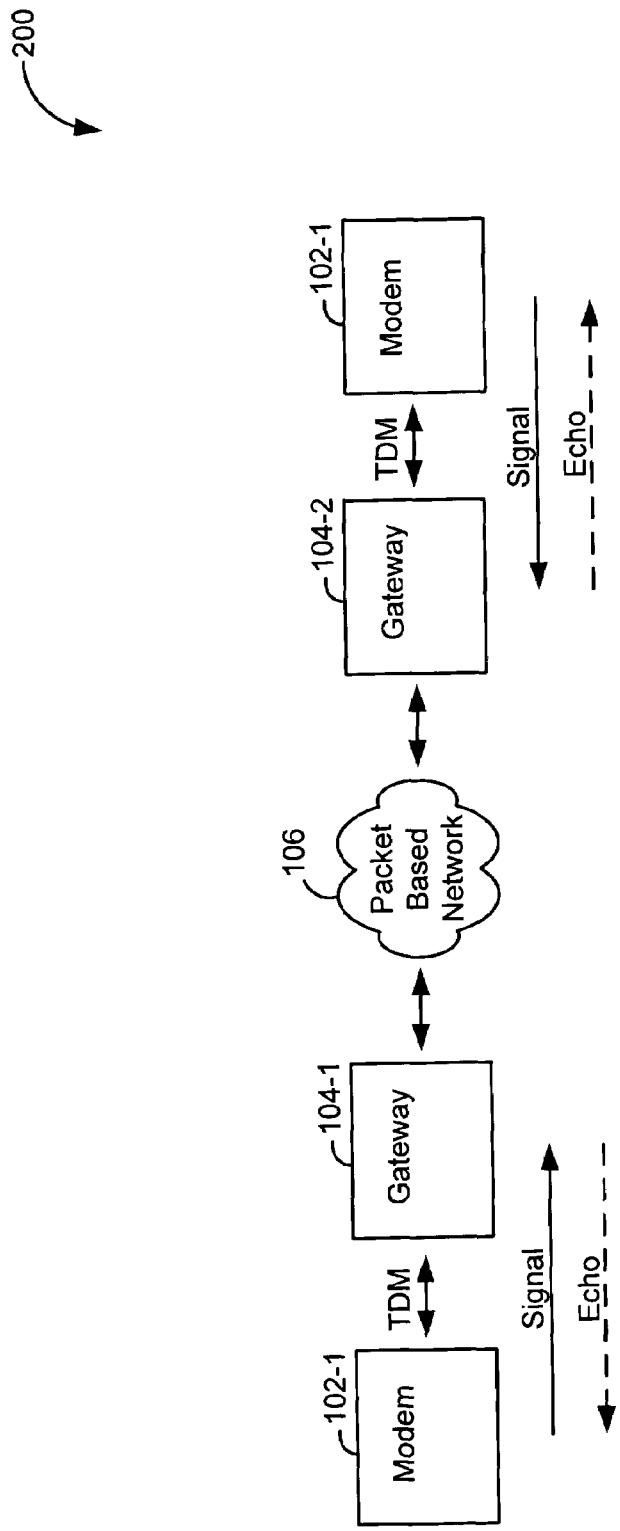
FIG. 10 depicts a system for processing an echo according to one embodiment of the present invention.

FIG. 10 depicts a system 1000 for processing an echo according to one embodiment of the present invention. As shown, system 1000 includes a secure device 102-1, gateway 104-1, gateway 104-2, and secure device 102-2. A traditional modem sends analog data to a digital/analog converter, which converts the data to digital. The digital/analog converter then sends the digital data to another digital analog converter of another modem, which converts the data to analog. As a side effect this produces two echoes, a near end echo and a far end echo. The near end echo is normally a short period of time and the far end echo is longer as compared to the near end echo. For example, a near end echo may be 20 milliseconds and the far end echo may be 1040 milliseconds. Because of difficulties with modem modems, modems may time out before the far end echo is received. Thus, a fault occurs and signals sent from the modem may be distorted. Typically, modems include a far end echo canceller that cancels out the far end echo. However, modem modems may time out before the far end echo is received and thus the far end echo canceller is not enabled. Consequently, the signals sent from the modem may be distorted by the far end echo when it is not cancelled.

Using embodiments of the present invention, gateway 104-1 and/or gateway 104-2 are used to eliminate the need to cancel out the far end echo. Because gateway 104-1 and gateway 104-2 communicate with secure device 102-1 and secure device 102-2, respectively, as described above, the far end echo is not needed. When secure device 104-1 sends a signal to gateway 104-2, there is no echo between the gateways because it is in the "digital domain", and thus does not produce an echo. The echo is produced by gateway 104-1 and 104-2 on the analog circuits when sending/receiving data from secure device 102-1 and 102-2 as a side effect for converting analog data to digital data.

When the signal is sent through gateway 104-2 to secure device 102-2, an echo may be produced. This echo is canceled by a modem in gateway 104-2. Accordingly, an echo is not sent to secure device 102-1 from gateway 104-2.

Secure device 102-2 may also perceive a near echo coming from gateway 104-2 and not secure device 102-1. This is a near end echo and any far end echo can be ignored because echo is only occurring locally (near end) between secure device 102-1 and gateway 104-1 in the transmission and is not sent from gateway 104-1 to gateway 104-2.

When secure device 102-2 sends a response to gateway 104-2, an echo may be created back towards secure device 102-2. This echo is canceled by secure device 102-2. It is also not sent between gateway 104-2 and gateway 104-1. An echo may be created from gateway's A/D conversion. This echo is not sent to gateway 104-1 and thus secure device 102-1. Thus, secure device 102-1 does not need a far end echo canceller. This echo may be sent to secure device 104-2, which may cancel the near end echo.

Accordingly, secure device 102-1 does not receive a far end echo from any D/A or A/D conversion by gateway 104-2 or secure device 102-2, and vice versa for secure device 102-2. Thus a far end echo canceller is not needed for secure devices 102-1 and 102-2.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for compensating for data backup in a queue for synchronous communications between a first terminal and a second terminal, wherein data is relayed from the first terminal to a first gateway, which sends the data to a second gateway in an asynchronous communication, the second gateway sending the data to the second terminal, the method comprising:
   receiving data and idle bits from the first terminal, wherein the data comprises a plurality of data blocks and wherein each data block is delimited by start and stop bits from the first terminal;
   sending the data blocks to the second gateway for the asynchronous communication, wherein the idle bits are discarded by the first gateway and are not sent to the second gateway;
   storing the data in a queue at the second gateway; and
   sending data from the queue to the second terminal.

2. The method of claim 1, wherein the start and stop bits are not transmitted from the first gateway to the second gateway.

3. The method of claim 2, wherein the second gateway sends start and stop bits when the second gateway sends data to the second terminal without reliance on start and stop bits sent from the first terminal.

4. The method of claim 1, wherein the first gateway and the first terminal negotiate to establish a first connection while the second gateway and the second terminal negotiate to establish a second connection.

5. The method of claim 4, wherein the first terminal and the first gateway finish the first negotiation before the second negotiation between the second terminal and the second gateway, wherein data is sent from the first terminal to the first gateway, which then sends the data to the second gateway before the second negotiation is finished thereby resulting in a data backup.

6. The method of claim 1, wherein the first terminal and second terminal comprise FNBDT devices or v.14 compliant modems.

7. A method for compensating for data backup in a queue for synchronous communications between a first terminal and a second terminal, wherein data is relayed from the first terminal to a first gateway, which sends the data to a second gateway in an asynchronous communication, the second gateway sending the data to the second terminal, the method comprising:
   negotiating a first connection between the first terminal and the first gateway and a second connection between the second gateway and the second terminal;
   receiving data for the asynchronous communication at the second gateway from the first gateway over a packet based network;
   storing the data in a queue, the data including communication data and filler information;
   interpreting the data in the queue to determine if it includes filler information;
   discarding the filler information; and
   sending communication data from the queue instead of the filler information,
   wherein the first and second gateways negotiate the first and second connections independently, and wherein the first gateway sends data from the first connection to the second gateway without regard to whether the second connection is established.

8. The method of claim 7, wherein the data is scrambled and the method further comprises descrambling the scrambled data.

9. The method of claim 8, wherein the descrambled data is interpreted to determine if the descrambled data includes filler information.

10. The method of claim 9, further comprising rescrambling the communication data.

11. The method of claim 10, further comprising sending the rescrambled communication data to a second terminal.

12. The method of claim 3, wherein the first gateway and the first terminal negotiate to establish a first connection while the second gateway and the second terminal negotiate to establish a second connection.

13. The method of claim 12, wherein the first terminal and the first gateway finish the first negotiation before the second negotiation between the second terminal and the second gateway, wherein data is sent from the first terminal to the first gateway, which then sends the data to the second gateway before the second negotiation is finished thereby resulting in a data backup.

14. The method of claim 7, wherein the first terminal and the second terminal comprise STU devices.

15. A system for compensating for data backup in a queue for synchronous communications between a first terminal and a second terminal, wherein data is relayed from the first terminal to a first gateway, which sends the data to a second gateway in an asynchronous communication, the second gateway sending the data to the second terminal, the method comprising:
   a first terminal configured to send a synchronous data stream that is scrambled;
   a first gateway configured to receive the synchronous data stream that is scrambled and to convert the synchronous data stream to an asynchronous data stream that includes the scrambled data;
   a second gateway configured to receive the asynchronous data stream that includes the scrambled data and to descramble the scrambled data from the asynchronous data stream, wherein the second gateway is configured to:
   store the descrambled data in a queue, including communication data and filler information;
   determine if the queue includes filler information;
   discard the filler information; and
   send communication data from the queue instead of the filler information.

16. The system of claim 15, wherein the first terminal and the second terminal comprise STU devices.

17. A system compensating for data backup in a queue for synchronous communications between a first terminal and a second terminal, wherein data is relayed from the first terminal to a first gateway, which sends the data to a second gateway in an asynchronous communication, the second gateway sending the data to the second terminal, the method comprising:
   a first terminal configured to send a synchronous data stream that includes communication data and idle bits, the communication data comprising a plurality of data blocks each delimited by start and stops bits;
   a first gateway configured to receive the data blocks from the synchronous data stream according to the start and stop bits, the first gateway configured to discard the idle bits and to send an asynchronous data stream that includes the communication data and not the idle bits;
   a second gateway configured to receive the asynchronous data stream that includes the communication data and convert it into a synchronous data stream; and
   a second terminal configured to receive synchronous data stream.

18. The system of claim 17, wherein the first terminal and the second terminal comprise FNBDT devices or v.14 compliant modems.

19. A method for compensating for data fluctuation in synchronous communications between a first terminal and a second terminal, wherein data is relayed from the first terminal to a first gateway, which sends the data to a second gateway in an asynchronous communication, the second gateway sending the data to the second terminal, the method comprising:

receiving data for the asynchronous communication at the second gateway;

storing the data in a queue, the data including communication data and filler information;

interpreting the data in the queue to determine if it includes filler information;

discarding the filler information based upon a size of the data in the queue;

sending communication data from the queue instead of the filler information;

determining when the queue may underrun due to late or lost data sent from the first gateway to the second gateway; and sending communication, data previously transmitted from the queue if it is determined that the queue may underrun.

20. The method of claim 19, wherein the first terminal and second terminal comprise STU terminals.

* * * * *